(12) United States Patent
Lin

(10) Patent No.: US 9,516,717 B2
(45) Date of Patent: Dec. 6, 2016

(54) DIMMABLE LED ILLUMINATING SYSTEM, DRIVER OF THE ILLUMINATING SYSTEM, AND METHOD OF DRIVING THE ILLUMINATING SYSTEM

(71) Applicants: HEP TECH CO., LTD., Taichung (TW); Ming-Feng Lin, Taichung (TW)

(72) Inventor: Ming-Feng Lin, Taichung (TW)

(73) Assignees: HEP TECH CO., LTD., Taichung (TW); Ming-Feng Lin, Taichung (TW)

( * ) Notice: Subject to any disclaimer, the term of this patent is extended or adjusted under 35 U.S.C. 154(b) by 161 days.

(21) Appl. No.: 14/165,279

(22) Filed: Jan. 27, 2014

(65) Prior Publication Data

US 2014/0217912 A1    Aug. 7, 2014

(30) Foreign Application Priority Data

Feb. 7, 2013  (TW) .............................. 102104879 A

(51) Int. Cl.
H05B 37/02    (2006.01)
H05B 33/08    (2006.01)

(52) U.S. Cl.
CPC ........ *H05B 33/0845* (2013.01); *H05B 33/086* (2013.01); *H05B 33/0812* (2013.01); *H05B 33/0815* (2013.01)

(58) Field of Classification Search
CPC . H05B 33/0815; H05B 33/0845; H05B 37/02; H05B 33/0806; H05B 33/0809; H05B 33/0812; H05B 33/0848
USPC ............... 315/291, 294, 224, 307, 119, 127, 129,315/200 R, 201, 247, 292, 295, 313, 32
See application file for complete search history.

(56) References Cited

U.S. PATENT DOCUMENTS

| | | | | | |
|---|---|---|---|---|---|
| 4,037,117 | A * | 7/1977 | Carbrey | ............... | H03K 17/725 327/428 |
| 5,055,746 | A * | 10/1991 | Hu | ...................... | H02J 13/0048 315/294 |
| 5,068,576 | A * | 11/1991 | Hu | ...................... | H02M 5/2576 315/291 |
| 9,351,356 | B2 * | 5/2016 | He | ...................... | H05B 33/0815 |
| 2011/0095703 | A1 * | 4/2011 | Wilson | ............... | H05B 33/0863 315/294 |
| 2011/0109249 | A1 * | 5/2011 | Liu | .................... | H05B 33/0809 315/307 |
| 2012/0242247 | A1 * | 9/2012 | Hartmann | .......... | H05B 33/0863 315/294 |

* cited by examiner

*Primary Examiner* — Thai Pham
*Assistant Examiner* — Borna Alaeddini
(74) *Attorney, Agent, or Firm* — WPAT, PC; Justin King; Douglas A. Hosack

(57) ABSTRACT

A dimmable LED illumination system includes a LED lamp, a switch, and a driver. The LED lamp receives electric signals to emit light; the switch is connected to a power source, and generates a pulse signal by being turned off and then on again in a predetermined time; the driver connects the switch to the LED lamp to convert electric power of the power source into the electric signals which are supplied to the LED lamp when the switch is turned on. In addition, the driver saves a setting luminance, a default illumination mode, and a luminance adjustment mode. When the driver receives the pulse signal, one of the two modes is selected to light the LED lamp.

18 Claims, 3 Drawing Sheets

DIMMABLE LED ILLUMINATING SYSTEM, DRIVER OF THE ILLUMINATING SYSTEM, AND METHOD OF DRIVING THE ILLUMINATING SYSTEM

The current application claims a foreign priority to the patent application of Taiwan No. 102104879 filed on Feb. 2, 2013.

BACKGROUND OF THE INVENTION

1. Technical Field

The present invention relates generally to an illuminating system, and more particularly to a dimmable LED illuminating system, and a driver of the illuminating system. The present invention further provides a method of driving the illuminating system.

2. Description of Related Art

Fluorescent lamp is the commonest device for indoor lighting. In order to provide a room with different luminance, a conventional method is to light fluorescent lamps with different numbers. It is because that the fluorescent lamps can be turned on and off only; in other words, there is no intermediate status in between. Sometimes, it provides an uneven brightness in the room when specified fluorescent lamps are off. Furthermore, only a few grades of luminance can be selected because there are only a few combinations of the specific fluorescent lamps to be on and off.

In present days, more and more fluorescent lamps are replaced by LED (light emitting diode) lamps, which have significantly better energy conversion efficiency than the fluorescent lamps. In the field of LED lamps, how to make the LED lamp provide a stable and constant luminance is an important issue in design of the driver of the LED lamp. Some LED lamps are equipped with a dimmer to adjust the luminance. There are various dimmers for LED lamps in the present market, and however, the conventional driver can't match all the dimmers. Therefore, each dimmer must get a specified driver matched, and that is a problem for the LED lamps.

In addition, the dimmable LED is hard to directly replace the conventional dimmable light device, and that is impossible for a user to totally change the existing electric system, including the lamp holders, the switches, and the power line, just in order to match the new dimmable LED lamps. Therefore, the dimmable LED lamps still are not wildly used in the indoor lighting yet.

In conclusion, the dimmable LED lamp would replace the fluorescent lamp to be wildly used in indoor lighting if we can overcome aforesaid problems.

BRIEF SUMMARY OF THE INVENTION

In view of the above, the primary objective of the present invention is to provide a dimmable LED illuminating system, a driver for the dimmable LED illuminating system, and a method of driving the dimmable LED illuminating system, which is able to be incorporated in a conventional electric system for the conventional lighting device. The driver provides a dimming function to make the illuminating system dimmable.

The present invention provides a dimmable LED illumination system, which includes a LED lamp, a switch, and a driver. The LED lamp is for receiving electric signals to emit light; the switch is connected to a power source, wherein the switch generates a pulse signal by being turned off and then turned on in a predetermined time; the driver connects the switch to the LED lamp to supply the electric signals from the switch to the LED lamp, wherein the driver has a controller, and the controller saves a setting luminance, a default illumination mode, and a luminance adjustment mode. In the default illumination mode, the controller controls the LED lamp to light with the setting luminance; in the luminance adjustment mode, the controller controls the LED lamp to gradually change a luminance thereof, and the controller saves the luminance of the LED lamp as the setting luminance when the controller receives the pulse signal from the switch.

The present invention further provides a driver for lighting a LED lamp, which includes a power converting circuit and a controller. The power converting circuit is electrically connected to a power source and a LED lamp respectively, wherein the power converting circuit converts an electric power of the power source into electric signals, and supplies the electric signals to the LED lamp. The controller is electrically connected to the power converting circuit, wherein the controller saves a setting luminance, a default illumination mode, and a luminance adjustment mode. When in the default illumination mode, the controller controls the LED lamp to light with the setting luminance; when in the luminance adjustment mode, the controller controls the LED lamp to gradually change a luminance thereof, and the controller saves the luminance of the LED lamp as the setting luminance when controller receives the pulse from the switch.

The present invention further provides a method of controlling a LED lamp, which includes the steps of: A. lighting the LED lamp with a setting luminance; B. gradually changing a luminance of the LED lamp; C. saving the luminance of the LED lamp as the setting luminance at a time point, and lighting the LED lamp with the setting luminance afterward.

Whereby, the driver of the dimmable LED illumination system could adjust the luminance without changing the existing electric system, such as the lamp holders, the switches, and the power line, etc. In this way, the original function of the LED lamp is unaffected, and the brightness of the circumstance where the dimmable LED illumination system installed could be adjusted simply by turning off and then on the switch.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
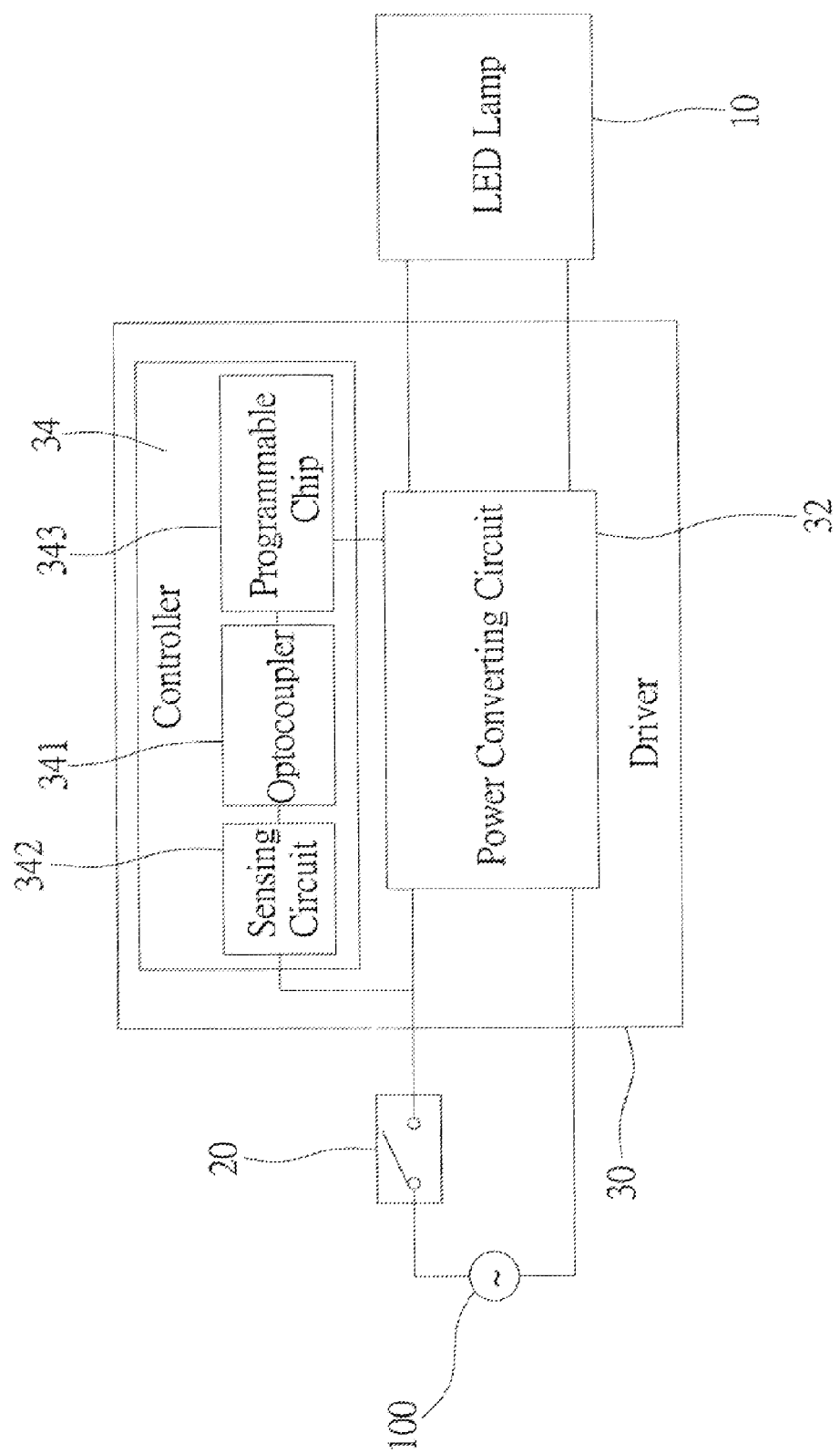
FIG. 1 is a circuit diagram of a first preferred embodiment of the present invention.

As shown in FIG. 1, a dimmable LED illuminating system of the first preferred embodiment of the present invention includes a LED lamp 10, a switch 20, and a driver 30.

The LED lamp 10 is mounted on a wall or a roof of a building (not shown). The LED lamp 10 has several light emitting diodes (LEDs) for being lighted by electric signals. A luminance of the LED lamp 10 is adjustable according to amplitude or pulse width of the electric signals, and the LED lamp 10 has a maximum luminance which is a luminance that the LED lamp 10 could possibly provide.

The switch 20 is mounted on a wall, and is connected to a power source 100 (power network of the building, for example). The switch 20 is operated to provide a pulse signal. In an embodiment, if the switch 20 is turned off, and then is turned on in a short time (three seconds, for example), the system will take it as a pulse signal.

In an embodiment, the driver 30 is integrated with the LED lamp 10 to be mounted on a wall or a roof of a building (not shown). The driver 30 has a power converting circuit 32 and a controller 34. The power converting circuit 32 is connected to the switch 20 and the LED lamp 10 respectively, so that the power converting circuit 32 receives electric power from the power source 100 when the switch 20 is turned on, converts the electric power into the electric signals, and then transmits the electric signals to the LED lamp 10 to light it. In an embodiment, the power converting circuit 32 is designed based on a PWM (pulse width modulation) circuit to change a pulse width of the electric signals. In another embodiment, the power converting circuit 32 changes amplitude of the electric signals. Of course, any change of waveform of the electric signals could be considered as an embodiment of the power converting circuit 32. The controller 34 is electrically connected to the power converting circuit 32, and has an optocoupler 341, a sensing circuit 342, and a programmable chip 343. The optocoupler 341 is connected to the sensing circuit 342 and the programmable chip 343 respectively to transfer signals between the sensing circuit 342 and the programmable chip 343 through light. The sensing circuit 342 is electrically connected to the switch 20 to sense the pulse signal, and send the sensing result to the programmable chip 343 through the optocoupler 341. The programmable chip 343 is electrically connected to the power converting circuit 32. The programmable chip 343 saves a setting luminance and two operating modes, which are default illumination mode and luminance adjustment mode. The electric signal provided by the power converting circuit 32 is controlled in one of the operating modes to light the LED lamp 10 with a specific luminance, and the pulse signal would change the operating modes alternately.

In the default illumination mode, the power converting circuit 32 controls the LED lamp 10 to light with the setting luminance.

In the luminance adjustment mode, the power converting circuit 32 changes the luminance of the LED lamp 10 gradually for a user to select a luminance of the LED lamp he/she prefers. When he/she founds a preferred luminance, he/she quickly turns the switch 20 off and on to generate the pulse. The luminance of the LED lamp 10 at this time point is saved in the programmable chip 343 as the setting luminance. Therefore, the default illumination mode will have a new setting luminance. In an embodiment, the operating mode is switched to the default illumination mode automatically after the pulse signal is detected in the luminance adjustment mode.

As a result, a luminance of the LED lamp 10 is adjustable by controlling the switch 20.

After the switch 20 is turned on, the programmable chip 343 controls the power converting circuit 32 to light the LED lamp 10 in the default illumination mode, so that the LED lamp 10 lights with the setting luminance afterward.

If a user quickly turns the switch 20 off and on, it generates the pulse signal, and when the sensing circuit 342 senses the pulse signal, it gives a signal to the programmable chip 343 through the optocoupler 341 to switch the programmable chip 343 to the luminance adjustment mode, and the LED lamp 10 is getting brighter gradually until the user quickly turns the switch 20 off and on again. In the luminance adjustment mode, the luminance of the LED lamp 10 is gradually getting brighter to the maximum luminance, and then gradually getting darker to a minimum luminance (the light is almost out), and then reversely repeat above procedures until the user quickly turns the switch 20 off and on again. In another embodiment, the LED lamp 10 is getting darker first, and then getting brighter in the luminance adjustment mode. When the user quickly turns the switch 20 off and on in the luminance adjustment mode, the sensing circuit 342 senses the pulse signal of the switch 20 to give the programmable chip 343 a signal through the optocoupler 341 to switch back to the default illumination mode and keep the selected luminance. At the same time, the luminance of the LED lamp is saved in the programmable chip 343 as the setting luminance. Next time when the LED lamp 10 is turned on, it will be lighted with the previous saved setting luminance.

With the driver of the present invention, all the existing devices for the conventional illumination system, such as switch, power line, and so on, can be incorporated in the dimmable LED illumination system of the present invention, and the user may adjust the luminance of the LED lamp 10 by quickly turning the switch 20 off and on to make the LED lamp 10 dimmable.

Figure 2:
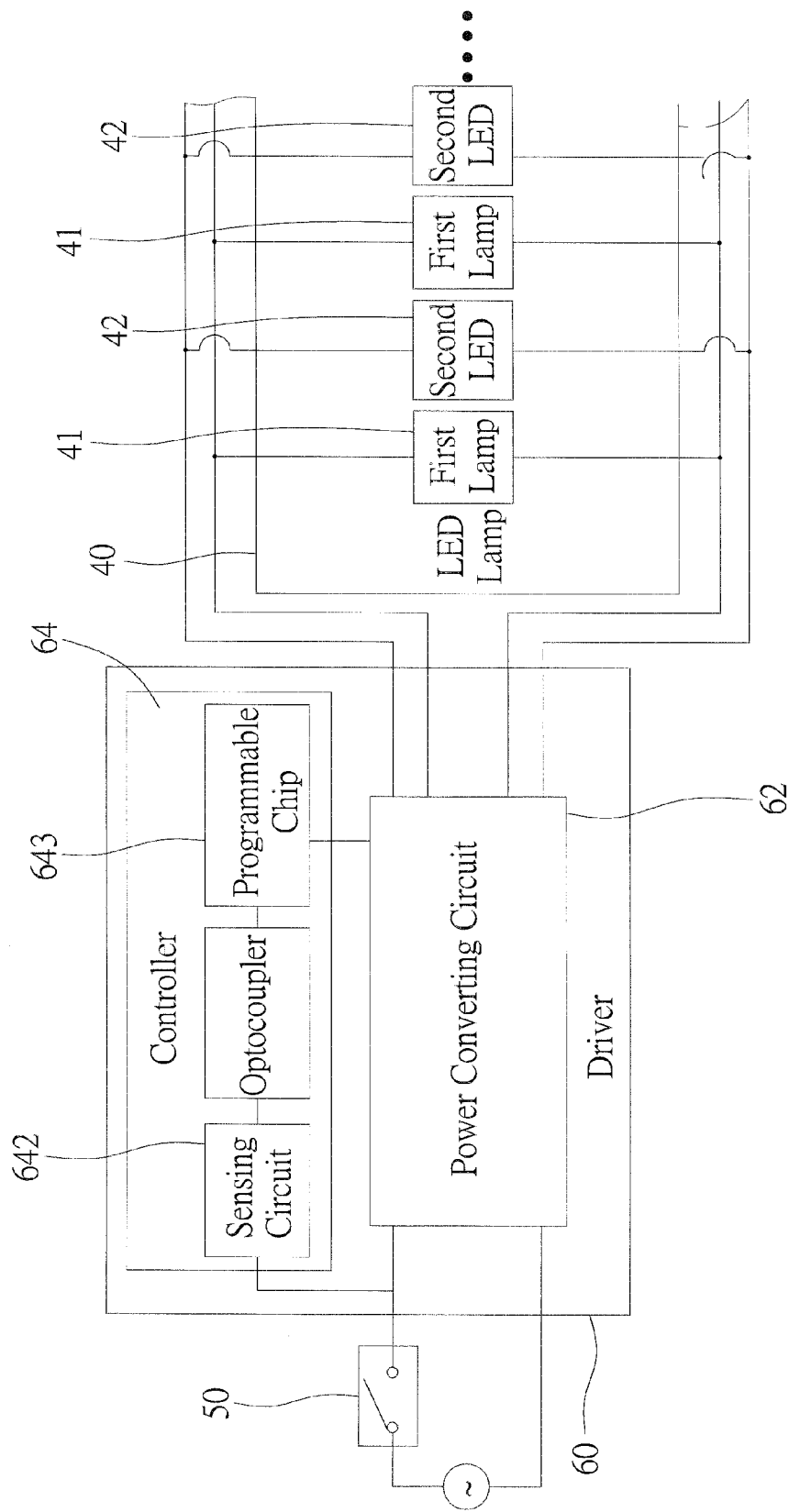
FIG. 2 is a circuit diagram of a second preferred embodiment of the present invention.

FIG. 2 shows a dimmable LED illumination system of the second preferred embodiment, which is basically the same as the first embodiment, including a LED lamp 40, a switch 50, and a driver 60. The different part is that the LED lamp 40 has a plurality of first LEDs 41 and a plurality of second LEDs 42. A light color of the first LEDs 41 is different from the second LEDs 42. For example, the light color of the first LEDs 41 is cold color, such as white or blue, and the light color of the second LEDs 42 is warm color, such as yellow or red. The driver 60 has a power converting circuit 62 electrically connected to the first LEDs 41 and the second LEDs 42 to adjust the luminance thereof respectively.

The driver 60 has a controller 64, and the controller has a programmable chip 64. The programmable chip 64, the same as above, saves a setting luminance and two operating modes, which are default illumination mode and luminance adjustment mode, and it further saves a first luminance, a second luminance, and a light color adjustment mode (the third operating mode). The power converting circuit 62 controls the first LEDs 41 and the second LEDs 42 to light with the first luminance and the second luminance respectively, and the first luminance and the second luminance add up to the setting luminance. A pulse signal is generated by quickly turning the switch 50 off and on to switch the operating modes. The functions and operations of the default illumination mode and luminance adjustment mode are the same as above. In the light color adjustment mode, the power converting circuit 62 changes the first luminance and the second luminance to change a color of the light of the LED lamp 40. When the user finds a preferred light color, he/she only has to quickly switches the switch off and on, and then and the first luminance and the second luminance at this time point are saved in the programmable chip 64. The operating mode is switched to the default illumination mode automatically, and the power converting circuit 62 controls the first LEDs 41 and the second LEDs 42 to light with the saved first luminance and the saved second luminance respectively afterward. Therefore, the dimmable LED illumination system of the second preferred embodiment is able to change the luminance and the color of the light by quickly turning the switch 50 off and on. It is noted that the luminance of the LED lamp 40 remains unchanged in the light color adjustment mode, and the ratio of the first luminance to the second luminance remains unchanged in the luminance adjustment mode.

A fourth operating mode, maximum illumination mode, can be incorporated in the dimmable LED illumination systems of the first and the second preferred embodiments. In the maximum illumination mode, all the LEDs of the LED lamp light with their maximum luminance. In an embodiment, the system is switched to the maximum illumination mode when the user turns the switch on for the first time (there is no setting luminance saved in the programmable chip). In an embodiment, the system is switched to the maximum illumination mode every time when the user turns the switch on after the system is off for a long time. In an embodiment, the maximum illumination mode is the last operating mode to be switched.

Figure 3:
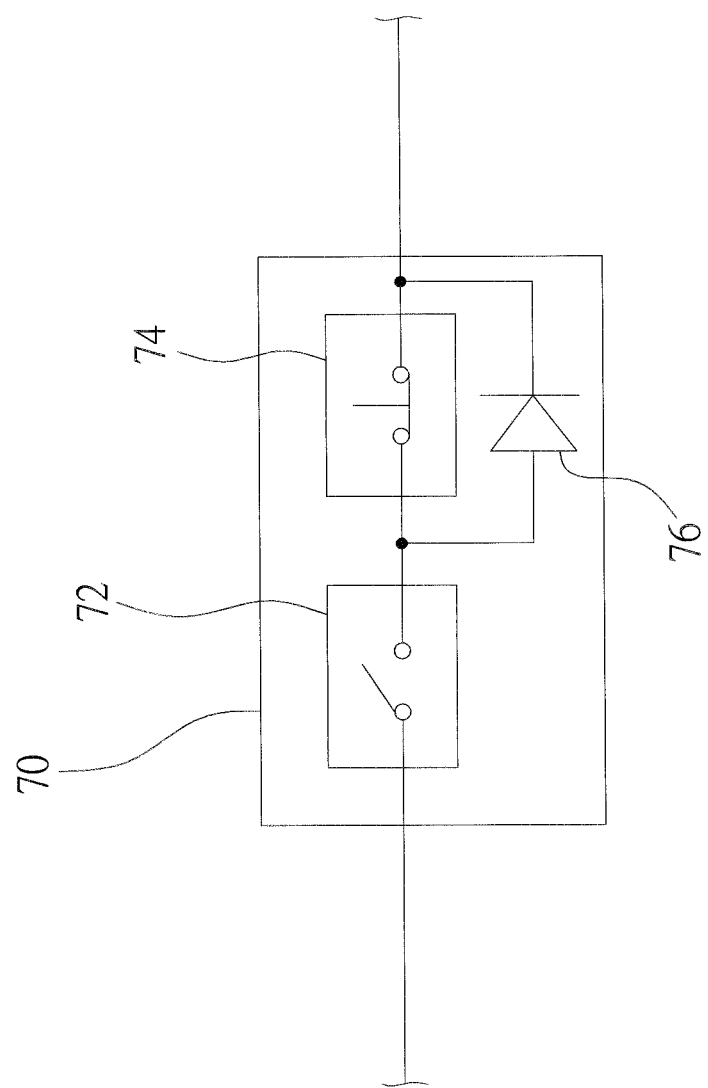
FIG. 3 is a circuit diagram of a third preferred embodiment of the present invention.

In the above embodiment, the light of the LED lamp is out for a very short time while a user is turning the switch off and on. FIG. 3 shows a dimmable LED illumination system of the third preferred embodiment, which is the same as above, except that a switch 70 has a switching device 70, a normally-closed switching device 74, and a diode 76. The switching device 70 is electrically connected to the normally-closed switching device 74 in series, and the diode 76 is electrically connected to the normally-closed switching device 74 in parallel. The switching device 70 is operated to turn the power on or off, and the normally-closed switching device 74 is operated to switch the operating modes. In the condition of the switching device 70 being turned off and the normally-closed switching device 74 is activated, the normally-closed switching device 74 is opened, and then automatically closed in a short time. It will generate a pulse signal to switch the operating modes. In the short time of the normally-closed switching device 74 being opened, a positive voltage of AC power will pass the diode 38 (the negative voltage is filtered out) to keep the LED lamp emitting light. As a result, the LED lamp will keep emitting light at the time when the user operates the normally-closed switching device 74 to switch the operating modes.

It must be pointed out that the embodiments described above are only some preferred embodiments of the present invention. All equivalent structures and methods which employ the concepts disclosed in this specification and the appended claims should fall within the scope of the present invention.

What is claimed is:

1. A dimmable LED illumination system, comprising:
   an LED lamp for receiving electric signals to emit light;
   a switch connected to a power source, wherein the switch generates a first pulse signal by being turned off and then turned on again within a first predetermined time; and
   a driver connecting the switch to the LED lamp to supply the electric signals from the switch to the LED lamp, wherein the driver has a controller, and the controller saves a luminance setting, a default illumination mode, and a luminance adjustment mode;
   wherein the default illumination mode is triggered when the switch is turned on, and in the default illumination mode the controller controls the LED lamp to light with the luminance setting;
   wherein the luminance adjustment mode is triggered when the controller receives the first pulse signal, and in the luminance adjustment mode the controller controls the LED lamp to automatically gradually cycle between a minimum brightness and a maximum brightness, and when the controller receives a second pulse signal from the switch by being turned off and then turned on within a second predetermined time during the luminance adjustment mode, the controller saves the current brightness of the LED lamp as the luminance setting.

2. The dimmable LED illumination system of claim 1, wherein the LED lamp includes a plurality of first LEDs and a plurality of second LEDs; a light color of the first LEDs is different to that of the second LEDs; the controller saves a first luminance, a second luminance, and a light color adjustment mode; in the default illumination mode and the luminance adjustment mode, the controller controls the first LEDs and the second LEDs to light with the first luminance and the second luminance respectively, and the first luminance and the second luminance add up to the setting luminance; in the light color adjustment mode, the controller changes the first luminance and the second luminance to gradually change a light color of the LED lamp until the controller receives the second pulse signal from the switch; the luminance of the LED lamp remains unchanged in the light color adjustment mode; once the pulse signal is received, the first luminance and the second luminance are saved in the controller, and the controller controls the first LEDs and the second LEDs to light with the saved first luminance and the saved second luminance respectively afterward.

3. The dimmable LED illumination system of claim 1, wherein the controller saves a maximum illumination mode; the controller controls the LED lamp to light with a maximum luminance in the maximum illumination mode.

4. The dimmable LED illumination system of claim 1, wherein the switch generates the pulse signal by being turned off and then turned on in three seconds.

5. The dimmable LED illumination system of claim 1, wherein the switch has two switching devices in series between the power source and the driver, and one of the switching device is closed.

6. The dimmable LED illumination system of claim 5, wherein the switch further includes a diode, which is electrically connected to the closed switching device in parallel.

7. The dimmable LED illumination system of claim 1, wherein the driver further has a power converting circuit, and the controller has a sensing circuit and a programmable chip; the setting luminance, the default illumination mode, and the luminance adjustment mode are saved in the programmable chip; the power converting circuit is electrically connected to the power source and the LED lamp respectively to convert an electric power of the power source into the electric signals which are supplied to the LED lamp; the sensing circuit is electrically connected to the switch to sense the pulse signal; the programmable chip is electrically connected to the power converting circuit to switch between the default illumination mode and the luminance adjustment mode when the pulse signal is sensed by the sensing circuit.

8. The dimmable LED illumination system of claim 7, wherein the controller further includes an optocoupler connecting the sensing circuit to the programmable chip to transmit signals from the sensing circuit to the programmable chip through light.

9. A driver for lighting an LED lamp, comprising:
   a power converting circuit, electrically connected to a power source and the LED lamp, wherein the power converting circuit converts an electric power of the power source into electric signals, and supplies the electric signals to the LED lamp; and a controller electrically connected to the power converting circuit, wherein the controller saves a luminance setting, a default illumination mode, and a luminance adjustment mode; wherein in the default illumination mode, the controller controls the LED lamp to light with the luminance setting;

wherein the luminance adjustment mode is triggered when the controller receives a first pulse signal, and in the luminance adjustment mode the controller controls the LED lamp to automatically gradually cycle between a minimum brightness and a maximum brightness, and when the controller receives a second pulse signal, the controller saves the current brightness of the LED lamp as the luminance setting.

10. The driver of claim 9, wherein the at least one LED includes a first LED and a second LED; a light color of the first LED is different to that of the second LED; the controller saves a first luminance, a second luminance, and a light color adjustment mode; the controller controls the first LED and the second LEDs to light with the first luminance and the second luminance respectively, and the first luminance and the second luminance add up to the setting luminance; in the light color adjustment mode, the controller changes the first luminance and the second luminance to gradually change a light color of the LED lamp until the controller receives the pulse signal from the switch; the luminance of the LED lamp remains unchanged in the light color adjustment mode; once the pulse signal is received, the first luminance and the second luminance are saved in the controller, and the controller controls the first LEDs and the second LEDs to light with the saved first luminance and the saved second luminance respectively afterward.

11. The driver of claim 9, wherein the controller saves a maximum illumination mode; the controller controls the LED lamp to light with a maximum luminance in the maximum illumination mode.

12. The driver of claim 9, wherein the controller has a sensing circuit and a programmable chip; the sensing circuit senses the pulse signal of a switch; the setting luminance, the default illumination mode, and the luminance adjustment mode are saved in the programmable chip; the programmable chip is electrically connected to the power converting circuit to switch between the default illumination mode and the luminance adjustment mode when the pulse signal is sensed by the sensing circuit.

13. The driver of claim 12, wherein the controller further includes an optocoupler connecting the sensing circuit to the programmable chip to transmit signals from the sensing circuit to the programmable chip through light.

14. A method of controlling a LED lamp, comprising the steps of
A. lighting the LED lamp to a luminance setting by turning on a switch;
B. automatically cycling between a minimum luminance and a maximum a luminance of the LED lamp in response to turning off the switch and then turning on the switch within a predetermined time; and
C. saving the current luminance of the LED lamp as the luminance setting upon turning off the switch and then turning on the switch within the predetermined time again, whereby the luminance setting of the LED lamp is reset.

15. The method as defined in claim 14, further comprising the step of lighting the LED lamp with a maximum luminance thereof before the step A.

16. The method as defined in claim 14, further comprising the step of lighting the LED lamp with a maximum luminance thereof after the step A.

17. The method as defined in claim 14, wherein the LED lamp has a plurality of first LEDs and a plurality of second LEDs; a light color of the first LEDs is different to that of the second LEDs; before the step B, the method further comprising the steps of:
gradually changing a first luminance, which is a luminance of the first LEDs, and a second luminance, which is a luminance of the second LEDs; and
saving the first luminance and the second luminance by control, and lighting the first LEDs and the second LEDs with the saved first luminance and the saved second luminance respectively afterward.

18. The method as defined in claim 14, wherein the LED lamp has a plurality of first LEDs and a plurality of second LEDs; a light color of the first LEDs is different to that of the second LEDs; after the step C, the method further comprising the steps of:
gradually changing a first luminance, which is a luminance of the first LEDs, and a second luminance, which is a luminance of the second LEDs; and
saving the first luminance and the second luminance by control, and lighting the first LEDs and the second LEDs with the saved first luminance and the saved second luminance respectively afterward.

* * * * *